(12) United States Patent
Yamashita et al.

(10) Patent No.: US 11,247,536 B2
(45) Date of Patent: Feb. 15, 2022

(54) VEHICLE AIR CONDITIONER

(71) Applicant: SANDEN AUTOMOTIVE CLIMATE SYSTEMS CORPORATION, Isesaki (JP)

(72) Inventors: Kohei Yamashita, Isesaki (JP); Ryo Miyakoshi, Isesaki (JP)

(73) Assignee: Sanden Automotive Climate Systems Corporation, Isesaki (JP)

( * ) Notice: Subject to any disclaimer, the term of this patent is extended or adjusted under 35 U.S.C. 154(b) by 132 days.

(21) Appl. No.: 16/634,476

(22) PCT Filed: Jul. 12, 2018

(86) PCT No.: PCT/JP2018/027411
§ 371 (c)(1),
(2) Date: Jan. 27, 2020

(87) PCT Pub. No.: WO2019/031203
PCT Pub. Date: Feb. 14, 2019

(65) Prior Publication Data
US 2021/0086591 A1 Mar. 25, 2021

(30) Foreign Application Priority Data

Aug. 9, 2017 (JP) .............................. JP2017-154106

(51) Int. Cl.
*B60H 3/02* (2006.01)
*B60H 1/00* (2006.01)
*B60H 1/22* (2006.01)

(52) U.S. Cl.
CPC ......... *B60H 3/024* (2013.01); *B60H 1/00392* (2013.01); *B60H 1/00642* (2013.01);
(Continued)

(58) Field of Classification Search
CPC ................ B60H 3/824; B60H 1/00392; B60H 1/00642; B60H 1/00785; B60H 1/22;
(Continued)

(56) References Cited

U.S. PATENT DOCUMENTS

| | | | |
|---|---|---|---|
| 5,878,589 A * | 3/1999 | Tanaka | B60H 1/00007 62/199 |
| 8,997,503 B2 * | 4/2015 | Morisita | B60H 1/00392 62/79 |
| 2020/0180401 A1 * | 6/2020 | Aoki | B60H 1/2218 |

FOREIGN PATENT DOCUMENTS

| | | |
|---|---|---|
| JP | 05-319071 A | 12/1993 |
| JP | 11-254936 A | 9/1999 |

(Continued)

OTHER PUBLICATIONS

Japan Patent Office, International Search Report issued in International Application No. PCT/JP2018/027411, dated Oct. 23, 2018.

*Primary Examiner* — Marc E Norman
(74) *Attorney, Agent, or Firm* — Baker Botts L.L.P.

(57) ABSTRACT

A vehicle air conditioner capable of making a determination that the dehumidification is unnecessary in a vehicle interior early to make a prompt transition from a dehumidifying mode to a heating mode and reduce power consumption is provided. A control device executes a heating mode to let a refrigerant discharged from a compressor 2 radiate heat in a radiator, decompress the refrigerant, and then let the refrigerant absorb heat in an outdoor heat exchanger 7, and a dehumidifying mode to let the refrigerant flow into the outdoor heat exchanger without flowing to the radiator to radiate heat therein, decompress the refrigerant, and then let the refrigerant absorb heat in a heat absorber 9 and let an auxiliary heater 23 generate heat. The control device shifts from the dehumidifying mode to the heating mode on the basis of the heat absorber suction air temperature Tevain (Continued)

being lowered more than a target heat absorber temperature TEO.

13 Claims, 7 Drawing Sheets

(52) U.S. Cl.
CPC ........... B60H 1/00785 (2013.01); B60H 1/22 (2013.01); *B60H 2001/2228* (2013.01)

(58) Field of Classification Search
CPC ............ B60H 2001/2228; B60H 3/024; F25B 2700/21172; F24F 3/153
See application file for complete search history.

(56) References Cited

FOREIGN PATENT DOCUMENTS

| | | |
|---|---|---|
| JP | 2014-094676 A | 5/2014 |
| JP | 2016-222098 A | 12/2016 |

\* cited by examiner

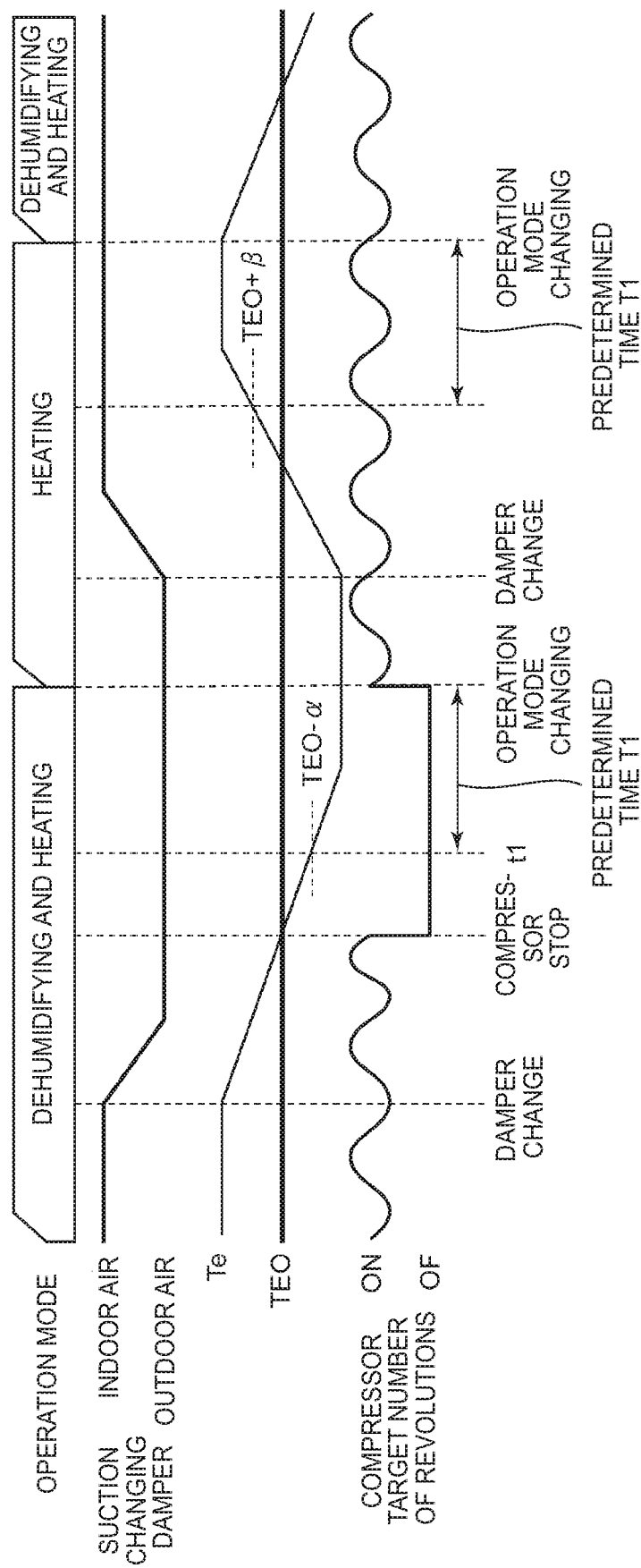

VEHICLE AIR CONDITIONER

CROSS-REFERENCE TO RELATED APPLICATIONS

This application is a U.S. National Stage Patent Application under 35 U.S.C. § 371 of International Patent Application No. PCT/JP2018/027411, filed on Jul. 12, 2018, which claims the benefit of Japanese Patent Application No. 2017-154106, filed on Aug. 9, 2017, the disclosures of each of which are incorporated herein by reference in their entirety.

TECHNICAL FIELD

The present invention relates to a vehicle air conditioner which conditions air of a vehicle interior of a vehicle, and particularly to a vehicle air conditioner which changes and executes heating and dehumidification of a vehicle interior.

BACKGROUND ART

Due to actualization of environmental problems in recent years, hybrid cars and electric vehicles have spread. Then, as an air conditioning device which is applicable to such a vehicle, there has been developed one which includes an electric compressor to compress and discharge a refrigerant, a heat absorber provided in an air flow passage to let the refrigerant absorb heat, a radiator provided within the air flow passage on an air downstream side of the heat absorber to let the refrigerant radiate heat, and an outdoor heat exchanger provided outside a vehicle interior to let the refrigerant radiate heat or absorb heat, and which changes and executes respective operation modes such as a heating mode to let the refrigerant discharged from the compressor radiate heat in the radiator and let the refrigerant from which the heat has been radiated in this radiator absorb heat in the outdoor heat exchanger, a dehumidifying and heating mode (dehumidifying mode) to let the refrigerant discharged from the compressor radiate heat in the radiator and let the refrigerant from which the heat has been radiated absorb heat in the heat absorber and the outdoor heat exchanger, a cooling mode to let the refrigerant discharged from the compressor radiate heat in the outdoor heat exchanger and let the refrigerant absorb heat in the heat absorber, etc. (e.g., refer to Patent Document 1).

CITATION LIST

Patent Document

Patent Document 1: Japanese Patent Application Publication No. 2016-222098

SUMMARY OF THE INVENTION

Problems to be Solved by the Invention

Here, since the air cooled by the heat absorber is heated again in the radiator in the dehumidifying and heating mode (dehumidifying mode), the dehumidifying and heating mode is deteriorated in operation efficiency and also increases in power consumption as compared with the heating mode. On the other hand, a transition (changing) of the operation mode from the dehumidifying and heating mode to the heating mode has been performed heretofore as shown in FIG. 6. In order to describe control of making the transition from the dehumidifying and heating mode to the heating mode, FIG. 6 shows changes in a target number of revolutions of the compressor, a temperature Te of the heat absorber, and a target heat absorber temperature TEO being its target value when changing from the dehumidifying and heating mode to the heating mode. Incidentally, a suction changing damper is a damper which adjusts a ratio between outdoor air and indoor air flowing into the air flow passage.

Now, assume that in the dehumidifying and heating mode, the compressor is controlled based on the temperature Te of the heat absorber and the target heat absorber temperature TEO being its target value. When the heat absorber temperature Te is reduced and lowered more than the target heat absorber temperature TEO due to a change in the indoor/outdoor air ratio by the suction changing damper, etc., the compressor is stopped (OFF). Thereafter, when a state (Te<(TEO−α)) in which the heat absorber temperature Te is further reduced and becomes lower than a temperature (TEO−α) lowered by a predetermined value α than the target heat absorber temperature TEO at a time t1 in FIG. 6 is continued for a predetermined time T1, the operation mode has been changed from the dehumidifying and heating mode to the heating mode. Incidentally, thereafter, when a state in which the heat absorber temperature Te becomes higher than the target heat absorber temperature TEO+a predetermined value β (TEO+β) is continued for a predetermined time, the operation mode is changed from the heating mode to the dehumidifying and heating mode on the condition that there is a request for dehumidification in the vehicle interior.

That is, in the related art, a problem arises in that since the dehumidification in the vehicle interior is determined to be unnecessary, and the dehumidifying and heating mode is changed to the heating mode where the state in which the heat absorber temperature Te becomes lower than the target heat absorber temperature TEO−α is continued for the predetermined time T1, a relatively long time is required for determination of the dehumidification unnecessity, and the dehumidifying and heating mode poor in operation efficiency is continued correspondingly.

The present invention has been developed to solve such conventional technical problems, and an object thereof is to provide a vehicle air conditioner capable of making a determination that the dehumidification is unnecessary in a vehicle interior early to make a prompt transition from a dehumidifying mode to a heating mode and reduce power consumption.

Means for Solving the Problems

A vehicle air conditioner of the invention of claim 1 includes a compressor to compress a refrigerant, an air flow passage through which air to be supplied to a vehicle interior flows, a heat absorber to let the refrigerant absorb heat, thereby cooling the air to be supplied from the air flow passage to the vehicle interior, a radiator disposed on a leeward side of the heat absorber to the flow of the air in the air flow passage to let the refrigerant radiate heat, thereby heating the air to be supplied from the air flow passage to the vehicle interior, an outdoor heat exchanger disposed outside the vehicle interior, an auxiliary heating device to let the air to be supplied from the air flow passage to the vehicle interior heat, and a control device. The vehicle air conditioner is characterized in that the control device changes and executes a heating mode to let the refrigerant discharged from the compressor radiate heat in the radiator, decompress the refrigerant from which the heat has been radiated, and then let the refrigerant absorb heat in the outdoor heat exchanger, and a dehumidifying mode to let the refrigerant discharged from the compressor flow into the outdoor heat exchanger without flowing to the radiator to radiate heat therein, decompress the refrigerant from which the heat has been radiated, and then let the refrigerant absorb heat in the heat absorber and let the auxiliary heating device generate heat, and See e.g., FIG. 4A) shifts from the dehumidifying mode to the heating mode (See reference "A") on the basis of a state in which a heat absorber suction air temperature Tevain that is a temperature of the air flowing into the heat absorber became lower than a target heat absorber temperature TEO that is a target value of a temperature Te of the heat absorber (See reference "B").

A vehicle air conditioner of the invention of claim 2 includes a compressor to compress a refrigerant, an air flow passage through which air to be supplied to a vehicle interior flows, a heat absorber to let the refrigerant absorb heat, thereby cooling the air to be supplied from the air flow passage to the vehicle interior, a radiator disposed on a leeward side of the heat absorber to the flow of the air in the air flow passage to let the refrigerant radiate heat, thereby heating the air to be supplied from the air flow passage to the vehicle interior, an outdoor heat exchanger disposed outside the vehicle interior, and a control device. The vehicle air conditioner is characterized in that the control device changes and executes a heating mode to let the refrigerant discharged from the compressor radiate heat in the radiator, decompress the refrigerant from which the heat has been radiated, and then let the refrigerant absorb heat in the outdoor heat exchanger, and a dehumidifying mode to let the refrigerant discharged from the compressor radiate heat in the radiator, decompress the refrigerant from which the heat has been radiated, and then let the refrigerant flow into the heat absorber and the outdoor heat exchanger to absorb heat, and shifts from the dehumidifying mode to the heating mode on the basis of a heat absorber suction air temperature Tevain being a temperature of the air flowing into the heat absorber being lowered more than a target heat absorber temperature TEO being a target value of a temperature Te of the heat absorber.

The vehicle air conditioner of the invention of claim 3 is characterized in that in the above respective inventions, when a state (Tevain<TEO−α) in which the heat absorber suction air temperature Tevain becomes lower than the target heat absorber temperature TEO−α predetermined value a is continued for a predetermined time T1, the control device shifts from the dehumidifying mode to the heating mode.

The vehicle air conditioner of the invention of claim 4 is characterized in the above respective inventions by including a suction changing damper capable of adjusting a ratio between outdoor air flowing into the air flow passage and indoor air being the air of the vehicle interior, and in that the control device estimates the heat absorber suction air temperature Tevain on the basis of the ratio between the outdoor air and the indoor air which is adjusted by the suction changing damper.

The vehicle air conditioner of the invention of claim 5 is characterized in that in the above invention, the control device calculates the heat absorber suction air temperature Tevain by a first-order lag calculation based on the ratio between the outdoor air and the indoor air.

The vehicle air conditioner of the invention of claim 6 is characterized in the invention of claim 4 or 5 by including an indoor blower to suck the air passed through the suction changing damper and blow out the air to the heat absorber, and in that the control device corrects the heat absorber suction air temperature Tevain on the basis of a heat receiving amount H1 from the indoor blower and/or an adjustment error E1 in the suction changing damper.

The vehicle air conditioner of the invention of claim 7 is characterized in the inventions of claims 1 to 3 by including a temperature sensor which detects the heat absorber suction air temperature Tevain.

Advantageous Effect of the Invention

Here, if the temperature (the heat absorber suction air temperature Tevain) of the air flowing into the heat absorber is lower than the target heat absorber temperature TEO, it is not necessary to originally dehumidify the vehicle interior in the heat absorber. Thus, in the invention of claim 1, in a vehicle air conditioner which includes a compressor to compress a refrigerant, an air flow passage through which air to be supplied to a vehicle interior flows, a heat absorber to let the refrigerant absorb heat, thereby cooling the air to be supplied from the air flow passage to the vehicle interior, a radiator disposed on a leeward side of the heat absorber to the flow of the air in the air flow passage to let the refrigerant radiate heat, thereby heating the air to be supplied from the air flow passage to the vehicle interior, an outdoor heat exchanger disposed outside the vehicle interior, an auxiliary heating device to let the air to be supplied from the air flow passage to the vehicle interior heat, and a control device, whereby the control device changes and executes a heating mode to let the refrigerant discharged from the compressor radiate heat in the radiator, decompress the refrigerant from which the heat has been radiated, and then let the refrigerant absorb heat in the outdoor heat exchanger, and a dehumidifying mode to let the refrigerant discharged from the compressor flow into the outdoor heat exchanger without flowing to the radiator to radiate heat therein, decompress the refrigerant from which the heat has been radiated, and then let the refrigerant absorb heat in the heat absorber and let the auxiliary heating device generate heat, the control device shifts from the dehumidifying mode to the heating mode on the basis of a heat absorber suction air temperature Tevain being a temperature of the air flowing into the heat absorber being lowered more than a target heat absorber temperature TEO being a target value of a temperature Te of the heat absorber. Therefore, even if the heat absorber temperature Te is not lower than the target heat absorber temperature TEO as in the related art, the dehumidifying mode can be changed to the heating mode with the heat absorber suction air temperature Tevain being lowered more than the target heat absorber temperature TEO.

Further, in the invention of claim 2, in a vehicle air conditioner which includes a compressor to compress a refrigerant, an air flow passage through which air to be supplied to a vehicle interior flows, a heat absorber to let the refrigerant absorb heat, thereby cooling the air to be supplied from the air flow passage to the vehicle interior, a radiator disposed on a leeward side of the heat absorber to the flow of the air in the air flow passage to let the refrigerant radiate heat, thereby heating the air to be supplied from the air flow passage to the vehicle interior, an outdoor heat exchanger disposed outside the vehicle interior, and a control device, whereby the control device changes and executes a heating mode to let the refrigerant discharged from the compressor radiate heat in the radiator, decompress the refrigerant from which the heat has been radiated, and then let the refrigerant absorb heat in the outdoor heat exchanger, and a dehumidifying mode to let the refrigerant discharged from the compressor radiate heat in the radiator, decompress the refrigerant from which the heat has been radiated, and then let the refrigerant flow into the heat absorber and the outdoor heat exchanger to absorb heat, the control device shifts from the dehumidifying mode to the heating mode on the basis of a heat absorber suction air temperature Tevain being a temperature of the air flowing into the heat absorber being lowered more than a target heat absorber temperature TEO being a target value of a temperature Te of the heat absorber. Therefore, even in this case, even if the heat absorber temperature Te is not lowered more than the target heat absorber temperature TEO as in the related art, the dehumidifying mode can be changed to the heating mode with the heat absorber suction air temperature Tevain being lowered more than the target heat absorber temperature TEO.

With these, according to the invention of claim 1 or 2, it is possible to make a determination that the dehumidification is unnecessary in the vehicle interior earlier than in the related art and make a rapid transition from the dehumidifying mode poor in operation efficiency to the heating mode which becomes good in operation efficiency. This is thus capable of achieving a reduction in power consumption and particularly becomes extremely suitable for the vehicle air conditioner which conditions air of the vehicle interior.

In this case, as in the invention of claim 3, if the control device shifts from the dehumidifying mode to the heating mode where a state (Tevain<TEO−α) in which the heat absorber suction air temperature Tevain becomes lower than the target heat absorber temperature TEO−α predetermined value α is continued for a predetermined time T1, it is possible to appropriately perform changing from the dehumidifying mode to the heating mode.

Further, as in the invention of claim 4, if a suction changing damper capable of adjusting a ratio between outdoor air flowing into the air flow passage and indoor air being the air of the vehicle interior is provided, and the control device estimates the heat absorber suction air temperature Tevain on the basis of the ratio between the outdoor air and the indoor air, which is adjusted by the suction changing damper, it is possible to estimate the heat absorber suction air temperature Tevain without providing a special temperature sensor to thereby make a transition from the dehumidifying mode to the heating mode.

Here, when the ratio between the outdoor air and indoor air changes, it takes some time until it is reflected on the heat absorber suction air temperature Tevain. That is, the heat absorber suction air temperature Tevain does not change immediately even if the ratio between the outdoor air and indoor air changes. Thus, as in the invention of claim 5, if the control device calculates the heat absorber suction air temperature Tevain by a first-order lag calculation based on the ratio between the outdoor air and indoor air, the control device is capable of performing the transition from the dehumidifying mode to the heating mode according to the actual change in the heat absorber suction air temperature Tevain.

Further, as in the invention of claim 6, if the control device corrects the heat absorber suction air temperature Tevain on the basis of a heat receiving amount H1 from an indoor blower to suck the air passed through the suction changing damper and blow out the air to the heat absorber and/or an adjustment error E1 in the suction changing damper, the control device is capable of estimating the heat absorber suction air temperature Tevain more accurately.

Incidentally, as in the invention of claim 7, when a temperature sensor detecting the heat absorber suction air temperature Tevain is provided, it is possible to make a transition from the dehumidifying mode to the heating mode on the basis of a detection value of the temperature sensor without performing the above-described estimation.

BRIEF DESCRIPTION OF THE DRAWINGS

FIG. 6 is a diagram describing transition control from a conventional dehumidifying and heating mode to a heating mode.

MODE FOR CARRYING OUT THE INVENTION

Hereinafter, description will be made as to embodiments of the present invention in detail with reference to the drawings.

Embodiment 1

Figure 1:
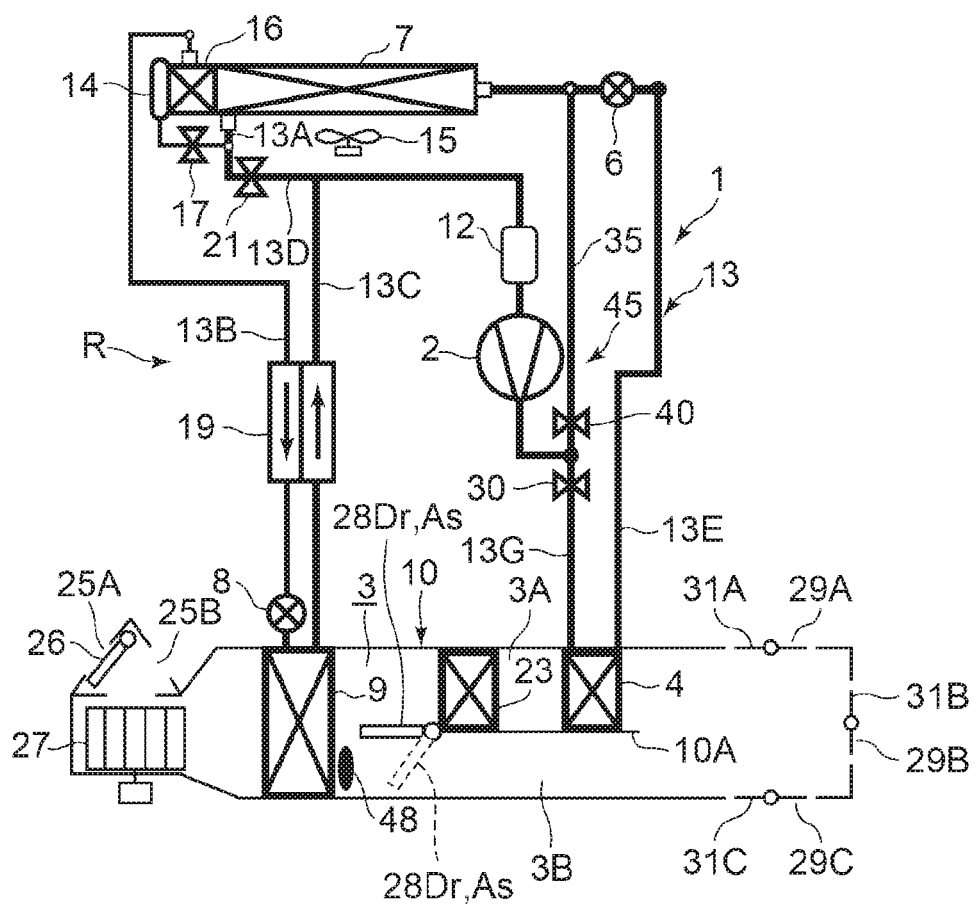
FIG. 1 is a constitutional view of a vehicle air conditioner of an embodiment to which the present invention is applied.

FIG. 1 shows a constitutional view of a vehicle air conditioner 1 of an embodiment of the present invention. A vehicle of the embodiment to which the present invention is applied is an electric vehicle (EV) in which an engine (an internal combustion engine) is not mounted, and runs with an electric motor for running which is driven by power charged in a battery (both being not shown in the drawing), and the vehicle air conditioner 1 of the present invention is also driven by the power of the battery. That is, in the electric vehicle which is not capable of performing heating by engine waste heat, the vehicle air conditioner 1 of the embodiment performs a heating mode by a heat pump operation in which a refrigerant circuit is used. Further, the vehicle air conditioner 1 selectively executes respective operation modes of a dehumidifying and heating mode, a dehumidifying and cooling mode, a cooling mode, a MAX cooling mode (maximum cooling mode), and an auxiliary heater single mode as dehumidifying modes in the present invention.

Incidentally, the vehicle is not limited to the electric vehicle, and the present invention is also effective for a so-called hybrid car in which the engine is used together with the electric motor for running. Further, it is needless to say that the present invention is also applicable to a usual car which runs with the engine.

The vehicle air conditioner 1 of the embodiment performs air conditioning (heating, cooling, dehumidifying, and ventilation) of a vehicle interior of the electric vehicle. An electric type of compressor 2 to compress a refrigerant, a radiator 4 provided in an air flow passage 3 of an HVAC unit 10 in which outdoor air or air in the vehicle interior is ventilated and circulated, to let the high-temperature high-pressure refrigerant discharged from the compressor 2 flow therein via a refrigerant pipe 13G and to let the refrigerant radiate heat to heat the air supplied to the vehicle interior, an outdoor expansion valve 6 (a pressure reducing unit) constituted of an electric valve which decompresses and expands the refrigerant during the heating, an outdoor heat exchanger 7 which is provided outside the vehicle interior and which performs heat exchange between the refrigerant and the outdoor air to function as the radiator during the cooling and to function as an evaporator during the heating, an indoor expansion valve 8 (a pressure reducing unit) constituted of an electric valve to decompress and expand the refrigerant, a heat absorber 9 provided in the air flow passage 3 to let the refrigerant absorb heat during the cooling and dehumidifying to cool the air to be supplied to the vehicle interior, an accumulator 12, and others are successively connected by a refrigerant pipe 13, whereby a refrigerant circuit R is constituted. In this case, the radiator 4 is disposed on a leeward side (air downstream side) of the heat absorber 9 to the flow of the air in the air flow passage 3.

Then, the refrigerant circuit R is filled with a predetermined amount of refrigerant and oil for lubrication. Incidentally, an outdoor blower 15 is provided in the outdoor heat exchanger 7. The outdoor blower 15 forcibly passes the outdoor air through the outdoor heat exchanger 7 to thereby perform the heat exchange between the outdoor air and the refrigerant, whereby the outdoor air is made to pass through the outdoor heat exchanger 7 even during stopping of the vehicle (i.e., its velocity is 0 km/h).

Further, the outdoor heat exchanger 7 has a receiver drier portion 14 and a subcooling portion 16 successively on a refrigerant downstream side. A refrigerant pipe 13A extending out from the outdoor heat exchanger 7 is connected to the receiver drier portion 14 via a solenoid valve 17 to be opened during the cooling. A refrigerant pipe 13B on an outlet side of the subcooling portion 16 is connected to an inlet side of the heat absorber 9 via the indoor expansion valve 8. Incidentally, the receiver drier portion 14 and the subcooling portion 16 structurally constitute a part of the outdoor heat exchanger 7.

Additionally, a refrigerant pipe 13B between the subcooling portion 16 and the indoor expansion valve 8 is provided in a heat exchange relation with a refrigerant pipe 13C on an outlet side of the heat absorber 9, and both the pipes constitute an internal heat exchanger 19. Consequently, the refrigerant flowing into the indoor expansion valve 8 through the refrigerant pipe 13B is made to be cooled (subcooled) by the low-temperature refrigerant flowing out from the heat absorber 9.

In addition, the refrigerant pipe 13A extending out from the outdoor heat exchanger 7 branches to a refrigerant pipe 13D, and this branching refrigerant pipe 13D communicates and connects with the refrigerant pipe 13C on a downstream side of the internal heat exchanger 19 via a solenoid valve 21 to be opened during the heating. The refrigerant pipe 13C is connected to the accumulator 12, and the accumulator 12 is connected to a refrigerant suction side of the compressor 2. Further, a refrigerant pipe 13E on an outlet side of the radiator 4 is connected to an inlet side of the outdoor heat exchanger 7 via the outdoor expansion valve 6.

Furthermore, a solenoid valve 30 (constituting a flow passage changing device) to be closed during dehumidifying and heating and MAX cooling to be described later is interposed in the refrigerant pipe 13G between a discharge side of the compressor 2 and an inlet side of the radiator 4. In this case, the refrigerant pipe 13G branches to a bypass pipe 35 on an upstream side of the solenoid valve 30. This bypass pipe 35 communicates and connects with the refrigerant pipe 13E on a downstream side of the outdoor expansion valve 6 via a solenoid valve 40 (also constituting a flow passage changing device) to be opened during the dehumidifying and heating and the MAX cooling. A bypass device 45 is constituted of these bypass pipe 35, solenoid valve 30 and solenoid valve 40.

The bypass device 45 is constituted of such a bypass pipe 35, a solenoid valve 30 and a solenoid valve 40 to thereby make it possible to smoothly perform changing of the dehumidifying and heating mode and the MAX cooling mode to allow the refrigerant discharged from the compressor 2 to directly flow in the outdoor heat exchanger 7, and the heating mode, the dehumidifying and cooling mode and the cooling mode to allow the refrigerant discharged from the compressor 2 to flow in the radiator 4, as will be described later.

Additionally, in the air flow passage 3 on an air upstream side of the heat absorber 9, respective suction ports of an outdoor air suction port 25A and an indoor air suction port 25B are formed. Outdoor air being the air outside the vehicle interior is sucked from the outdoor air suction port 25A, and indoor air being the air in the vehicle interior is sucked from the indoor air suction port 25B. Furthermore, a suction changing damper 26 is provided in the air flow passage 3, and an indoor blower (a blower fan) 27 for sucking the outdoor air and indoor air sucked from the respective suction ports 25A and 25B and blowing out them to the heat absorber 9 in the air flow passage 3 is provided on an air downstream side of the suction changing damper 26.

The suction changing damper 26 is constituted in such a manner that a ratio between the outdoor air and indoor air flowing into the heat absorber 9 in the air flow passage 3 can be adjusted between 0 and 100% by opening and closing the outdoor air suction port 25A and the indoor air suction port 25B at an arbitrary ratio. Incidentally, in the present application, the ratio between the outdoor air and the indoor air which is adjusted by the suction changing damper 26 is referred to as an indoor/outdoor air ratio RECrate. When the indoor/outdoor air ratio RECrate=1, an indoor air circulating mode in which the indoor air is 100% and the outdoor air is 0% is taken. When the indoor/outdoor air ratio RECrate=0, an outdoor air introducing mode in which the outdoor air is 100% and the indoor air is 0% is taken. Then, when 0<indoor/outdoor air ratio RECrate<1, an indoor/outdoor air intermediate position at which 0%<indoor air<100% and 100%>outdoor air>0% is taken. That is, in the present application, the indoor/outdoor air ratio RECrate means the rate of the indoor air of the air flowing into the heat absorber 9 in the air flow passage 3.

The suction changing damper 26 is controlled by an air conditioning controller 20 to be described later, and the above indoor air circulating mode, outdoor air introducing mode, and indoor/outdoor air intermediate position are selected by an automatic mode or a manual operation (a manual mode) to an air conditioning operating portion 53. In this case, when a cooling load in a cooldown time or the like is large or there are worries about outdoor air odors in urban districts or the like, the indoor air circulating mode is selected. When ventilation is required or window fogging at heating is prevented, the outdoor air introducing mode is selected in conjunction with a defroster switch (provided in the air conditioning operating portion 53 to be described later) or the like. Further, the indoor/outdoor air intermediate position is selected when both of a reduction in the heating load and the window fogging prevention at the heating are performed.

Furthermore, in FIG. 1, 23 denotes an auxiliary heater as an auxiliary heating device provided in the vehicle air conditioner 1 of the embodiment. The auxiliary heater 23 of the embodiment is constituted of a PTC heater (an electric heater) and provided in the air flow passage 3 on a windward side (an air upstream side) of the radiator 4 and on a leeward side (an air downstream side) of the heat absorber 9 to the flow of the air in the air flow passage 3. Then, when the auxiliary heater 23 is energized to generate heat, the air in the air flow passage 3 before flowing into the radiator 4 via the heat absorber 9 is heated. That is, the auxiliary heater 23 becomes a so-called heater core to perform heating of the vehicle interior or complement it.

Here, the air flow passage 3 on a leeward side (an air downstream side) more than the heat absorber 9 of the HVAC unit 10 is partitioned by a partition wall 10A to form a heating heat exchange passage 3A and a bypass passage 3B to bypass it. The aforementioned radiator 4 and auxiliary heater 23 are disposed in the heating heat exchange passage 3A.

Additionally, in the air flow passage 3 on a windward side of the auxiliary heater 23, there are provided air mix dampers 28Dr and 28As to adjust a ratio at which the air (the indoor air or outdoor air) in the air flow passage 3 flowing into the air flow passage 3 and passed through the heat absorber 9 is to be passed through the heating heat exchange passage 3A in which the auxiliary heater 23 and the radiator 4 are disposed.

Furthermore, the HVAC unit 10 on a leeward side of the radiator 4 is formed with respective outlets of a FOOT (foot) outlet 29A, a VENT (vent) outlet 29B, and a DEF (def) outlet 29C. The FOOT outlet 29A is an outlet to blow out the air to the foot of the vehicle interior and is located at the lowest position. Further, the VENT outlet 29B is an outlet to blow out the air to the proximity of the breast or face of a driver in the vehicle interior, and is located above the FOOT outlet 29A. Then, the DEF outlet 29C is an outlet to blow out the air to an inner surface of a front glass of the vehicle, and is located at the highest position above other outlets 29A and 29B.

Then, the FOOT outlet 29A, the VENT outlet 29B, and the DEF outlet 29C are respectively provided with a FOOT outlet damper 31A, a VENT outlet damper 31B, and a DEF outlet damper 31C to control a blow-out amount of the air.

Incidentally, the vehicle air conditioner 1 of the embodiment is capable of right-left independent air conditioning control at a driver's seat and a front passenger seat of the vehicle. The interior of the air flow passage 3 in which the radiator 4 and the auxiliary heater 23 are provided is partitioned into right and left parts by an unillustrated partition plate. Then, the aforementioned air mix damper 28Dr serves as an air mix damper for the driver's seat (right) and is provided in the right air flow passage 3, and the air mix damper 28As serves as an air mix damper for the front passenger seat (left) and is provided in the left air flow passage 3. Further, respective outlets of the above FOOT outlet damper 31A, VENT outlet damper 31B, and DEF outlet damper 31C are also respectively assumed to be provided in the right and left air flow passages 3 partitioned by the partition plate as for the driver's seat (right) and the front passenger seat (left). Then, those dampers enable driver's seat/front passenger seat identical air conditioning control (right/left identical air conditioning control) and driver' seat/front passenger seat independent air conditioning control (right/left independent air conditioning control) to be executed.

That is, when the driver's seat/front passenger seat identical air conditioning control (right/left identical air conditioning control) is made to function with a setting by the air conditioning operating portion 53 to be described later, the air mix damper 28Dr and the air mix damper 28As perform the same operation, and the respective outlet dampers 31A through 31C for the driver's seat and the front passenger seat also perform the same operation. On the other hand, when the driver's seat/front passenger seat independent air conditioning control (right/left independent air conditioning control) is made to function, the air mix dampers 28Dr and the air mix damper 28As are operated independently, and the respective outlet dampers 31A through 31C for the driver's seat and the front passenger seat are also operated independently.

Figure 2:
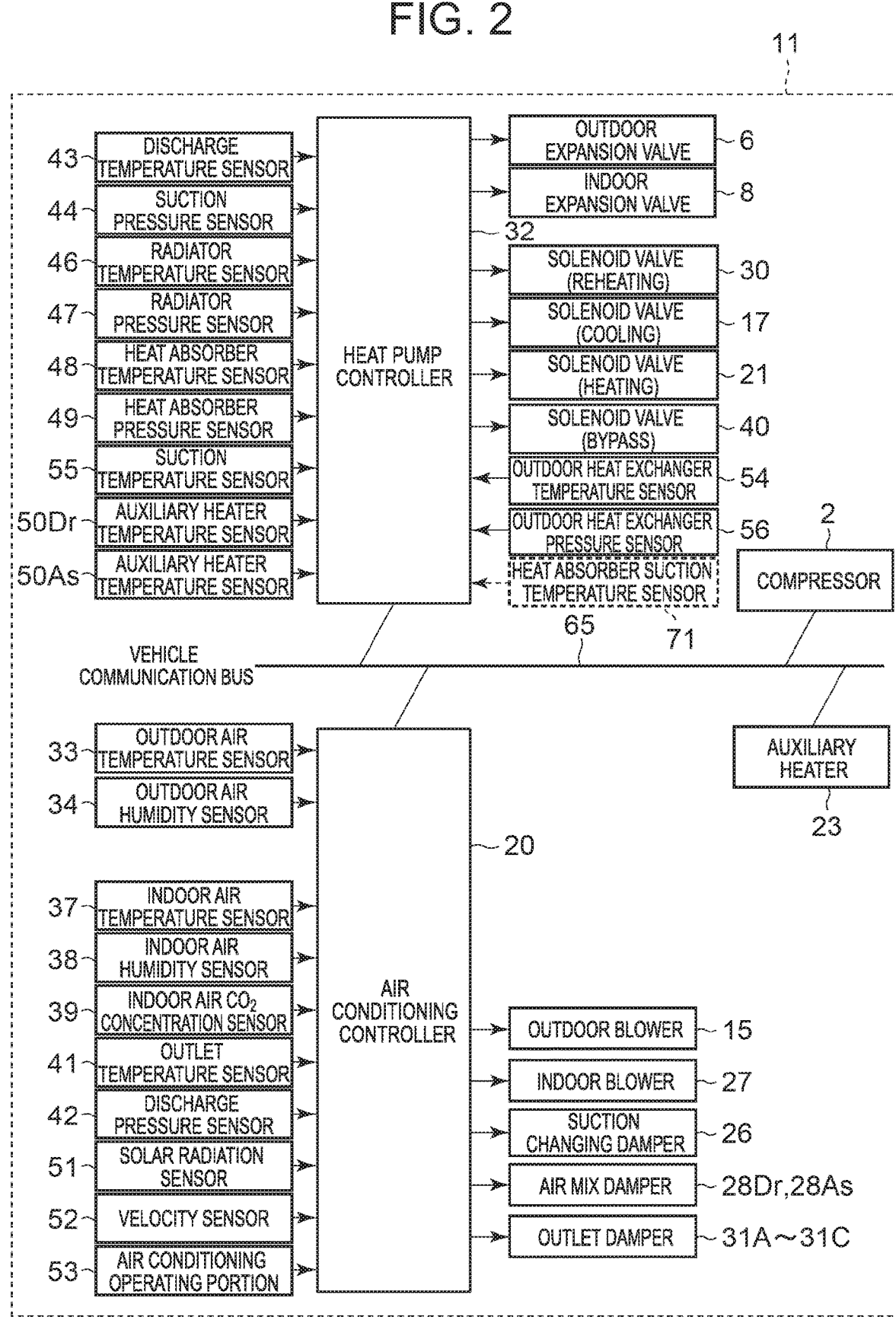
FIG. 2 is a block diagram of a control device of the vehicle air conditioner of FIG. 1.
Figure 3:
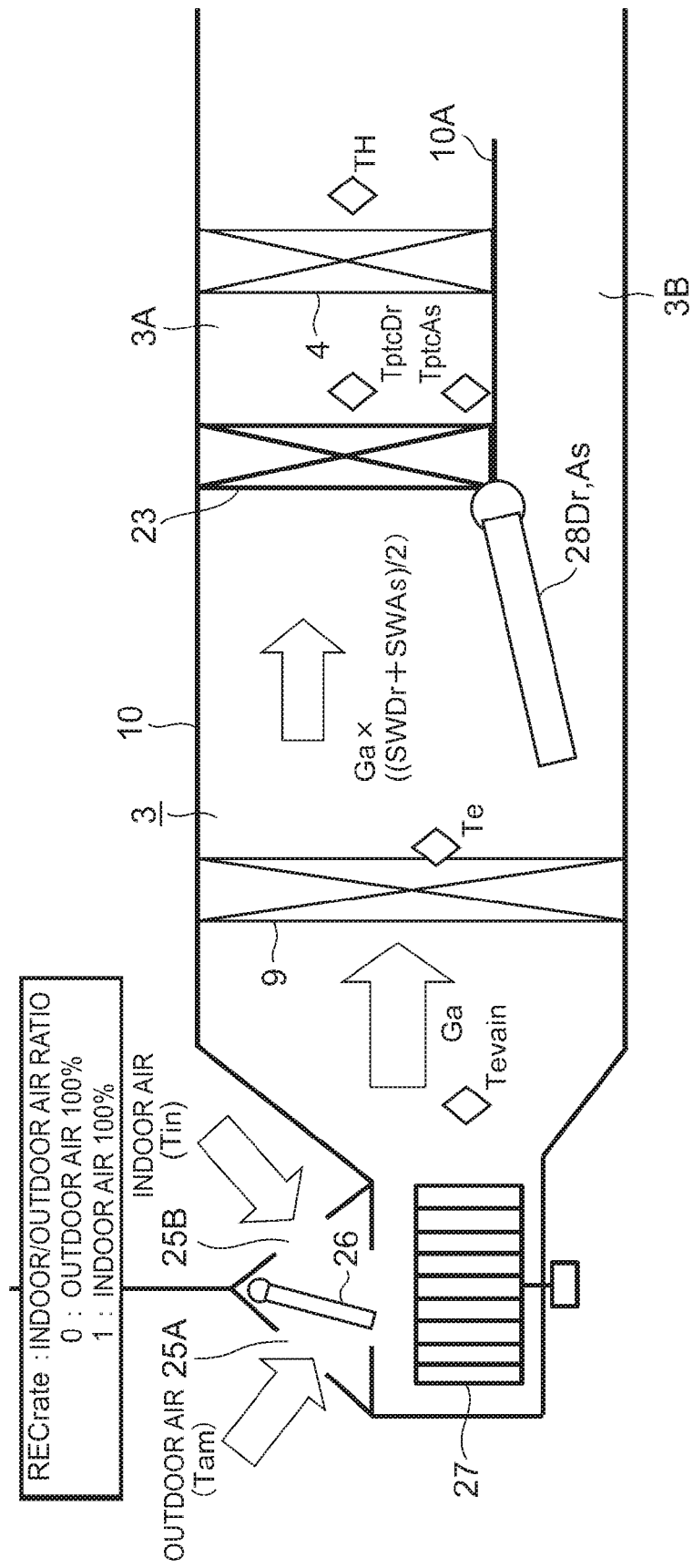
FIG. 3 is a vertical sectional side view of an HVAC unit of the vehicle air conditioner of FIG. 1.

Next, FIG. 2 shows a block diagram of a control device 11 of the vehicle air conditioner 1 of the embodiment. The control device 11 is constituted of an air conditioning controller 20 and a heat pump controller 32 both constituted of a microcomputer as an example of a computer having a processor. These are connected to a vehicle communication bus 65 which constitutes a CAN (Controller Area Network) or a LIN (Local Interconnect Network). Further, the compressor 2 and the auxiliary heater 23 are also connected to the vehicle communication bus 65. These air conditioning controller 20, heat pump controller 32, compressor 2 and auxiliary heater 23 are constituted to perform transmission and reception of data through the vehicle communication bus 65.

The air conditioning controller 20 is a high-order controller which performs control of vehicle interior air conditioning of the vehicle. An input of the air conditioning controller 20 is connected with respective outputs of an outdoor air temperature sensor 33 which detects an outdoor air temperature Tam (a temperature of the air outside the vehicle interior) of the vehicle, an outdoor air humidity sensor 34 which detects an outdoor air humidity, an indoor air temperature sensor 37 which detects a temperature (an indoor air temperature Tin) of the air (the indoor air) of the vehicle interior, an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out to the vehicle interior, a discharge pressure sensor 42 which detects a discharge refrigerant pressure (a discharge pressure Pd) of the compressor 2, a solar radiation sensor 51 of, e.g., a photo sensor system to detect a solar radiation amount into the vehicle interior, and a velocity sensor 52 to detect a moving speed (a velocity) of the vehicle, and the air conditioning (aircon) operating portion 53 to set the changing of a predetermined temperature or the operation mode.

Further, an output of the air conditioning controller 20 is connected with the outdoor blower 15, the indoor blower (the blower fan) 27, the suction changing damper 26, the air mix dampers 28Dr and 28As, and the respective outlet dampers 31A through 31C, and they are controlled by the air conditioning controller 20.

The heat pump controller 32 is a controller which mainly performs control of the refrigerant circuit R. An input of the heat pump controller 32 is connected with respective outputs of a discharge temperature sensor 43 which detects a temperature of the refrigerant discharged from the compressor 2, a suction pressure sensor 44 which detects a pressure of the refrigerant to be sucked into the compressor 2, a suction temperature sensor 55 which detects a temperature Ts of the refrigerant to be sucked into the compressor 2, a radiator temperature sensor 46 which detects a refrigerant temperature (a radiator temperature TCI) of the radiator 4, a radiator pressure sensor 47 which detects a refrigerant pressure (a radiator pressure PCI) of the radiator 4, a heat absorber temperature sensor 48 which detects a refrigerant temperature (a heat absorber temperature Te) of the heat absorber 9, a heat absorber pressure sensor 49 which detects a refrigerant pressure of the heat absorber 9, an outdoor heat exchanger temperature sensor 54 which detects a refrigerant temperature (an outdoor heat exchanger temperature TXO) of an outlet of the outdoor heat exchanger 7, and an outdoor heat exchanger pressure sensor 56 which detects a refrigerant pressure (an outdoor heat exchanger pressure PXO) of the outlet of the outdoor heat exchanger 7.

Further, an input of the heat pump controller 32 is also connected with respective outputs of auxiliary heater temperature sensors 50Dr and 50As as plural temperature sensors which respectively detect a temperature (an auxiliary heater temperature Tptc) of the auxiliary heater 23. In this case, the auxiliary heater temperature sensor 50Dr is mounted so as to be capable of detecting a temperature of the auxiliary heater 23 at the right (driver's seat side) part partitioned by the partition plate. The auxiliary heater temperature sensor 50As is mounted so as to be capable of detecting a temperature of the auxiliary heater 23 at the left (front passenger seat side) part.

Further, an output of the heat pump controller 32 is connected with the outdoor expansion valve 6, the indoor expansion valve 8, and respective solenoid valves of the solenoid valve 30 (for the reheating), the solenoid valve 17 (for the cooling), the solenoid valve 21 (for the heating), and the solenoid valve 40 (for the bypass), and they are controlled by the heat pump controller 32. Incidentally, the compressor 2 and the auxiliary heater 23 respectively have controllers incorporated therein, and the controllers of the compressor 2 and the auxiliary heater 23 perform transmission and reception of data to and from the heat pump controller 32 via the vehicle communication bus 65 and are controlled by the heat pump controller 32.

The heat pump controller 32 and the air conditioning controller 20 mutually perform transmission and reception of the data via the vehicle communication bus 65 and control respective devices on the basis of the outputs of the respective sensors and the setting input by the air conditioning operating portion 53. However, in the embodiment in this case, an actual volumetric air volume Ga (an actual system air volume, which is calculated by the air conditioning controller 20) of the air flowing into the outdoor air temperature sensor 33, the discharge pressure sensor 42, the velocity sensor 52, and the air flow passage 3, air volume ratios SWDr and SWAs (calculated by the air conditioning controller 20) by the air mix dampers 28Dr and 28As, the above indoor/outdoor air ratio RECrate (adjusted by the air conditioning controller 20), and the output of the air conditioning operating portion 53 are transmitted from the air conditioning controller 20 to the heat pump controller 32 through the vehicle communication bus 65 and adapted to be supplied for control by the heat pump controller 32.

With the above constitution, an operation of the vehicle air conditioner 1 of the embodiment will next be described. In the embodiment, the control device 11 (the air conditioning controller 20 and the heat pump controller 32) changes and executes the respective operation modes of the heating mode, the dehumidifying and heating mode (dehumidifying mode), the dehumidifying and cooling mode, the cooling mode, the MAX cooling mode (maximum cooling mode), and the auxiliary heater single mode. Description will initially be made as to a flow and control of the refrigerant in each operation mode.

(1) Heating Mode

When the heating mode is selected by the heat pump controller 32 (an automatic mode) or a manual operation to the air conditioning operating portion 53 (a manual mode), the heat pump controller 32 opens the solenoid valve 21 (for the heating) and closes the solenoid valve 17 (for the cooling). The heat pump controller 32 also opens the solenoid valve 30 (for the reheating) and closes the solenoid valve 40 (for the bypass). Then, the heat pump controller 32 operates the compressor 2. The air conditioning controller 20 operates the respective blowers 15 and 27, and each of the air mix dampers 28Dr and 28As basically has a state of passing all the air in the air flow passage 3, which is blown out from the indoor blower 27 and then flows via the heat absorber 9, through the auxiliary heater 23 and the radiator 4 in the heating heat exchange passage 3A, but may adjust an air volume.

In consequence, a high-temperature high-pressure gas refrigerant discharged from the compressor 2 flows from the refrigerant pipe 13G into the radiator 4 via the solenoid valve 30. The air in the air flow passage 3 passes through the radiator 4, and hence the air in the air flow passage 3 is heated by the high-temperature refrigerant in the radiator 4 (by the auxiliary heater 23 and the radiator 4 when the auxiliary heater 23 operates). On the other hand, the refrigerant in the radiator 4 has the heat taken by the air and is cooled to condense and liquefy.

The refrigerant liquefied in the radiator 4 flows out from the radiator 4 and then flows through the refrigerant pipe 13E to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15. In other words, the refrigerant circuit R functions as a heat pump. Then, the low-temperature refrigerant flowing out from the outdoor heat exchanger 7 flows through the refrigerant pipe 13A, the solenoid valve 21, and the refrigerant pipe 13D, and flows from the refrigerant pipe 13C into the accumulator 12 to perform gas-liquid separation thereat, and thereafter the gas refrigerant is sucked into the compressor 2, thereby repeating this circulation. The air heated by the radiator 4 (the auxiliary heater 23 and the radiator 4 when the auxiliary heater 23 operates) is blown out from the respective outlets 29A through 29C, and hence the heating of the vehicle interior is performed.

The heat pump controller 32 calculates a target radiator pressure PCO (a target value of the radiator pressure PCI) from a target heater temperature TCO (a target value of a heating temperature TH to be described later) calculated from a target outlet temperature TAO by the air conditioning controller 20, and controls the number of revolutions NC of the compressor 2 on the basis of the target radiator pressure PCO and the refrigerant pressure (the radiator pressure PCI that is a high pressure of the refrigerant circuit R) of the radiator 4 which is detected by the radiator pressure sensor 47 to control heating by the radiator 4. Further, the heat pump controller 32 controls a valve position of the outdoor expansion valve 6 on the basis of the refrigerant temperature (the radiator temperature TCI) of the radiator 4 which is detected by the radiator temperature sensor 46 and the radiator pressure PCI detected by the radiator pressure sensor 47, and controls a subcool degree SC of the refrigerant in the outlet of the radiator 4 to a target subcool degree TGSC being a target value of the subcool degree SC.

Further, when the heating capability by the radiator 4 runs shorter than a heating capability (required heating capability TGQ) required for vehicle-interior air conditioning in the heating mode, the heat pump controller 32 controls energization of the auxiliary heater 23 to complement its shortage by the generation of heat by the auxiliary heater 23. Thus, the comfortable heating of the vehicle interior is achieved and frosting of the outdoor heat exchanger 7 is also suppressed. In the embodiment, since the auxiliary heater 23 is disposed on the air upstream side of the radiator 4, the air flowing through the air flow passage 3 passes through the auxiliary heater 23 before the radiator 4.

In this case, in the embodiment, the heat pump controller 32 controls energization of the auxiliary heater 23 assuming an average value of a detection value TptcDr of the auxiliary heater temperature sensor 50Dr and a detection value TptcAs of the auxiliary heater temperature sensor 50As as an auxiliary heater temperature Tptc.

(2) Dehumidifying and Heating Mode (Dehumidifying Mode)

Next, in the dehumidifying and heating mode as the dehumidifying mode in the present invention, the heat pump controller 32 opens the solenoid valve 17 and closes the solenoid valve 21. Further, the heat pump controller 32 closes the solenoid valve 30 and opens the solenoid valve 40, and fully closes the valve position of the outdoor expansion valve 6. Then, the heat pump controller 32 operates the compressor 2. The air conditioning controller 20 operates the respective blowers 15 and 27, and each of the air mix dampers 28Dr and 28As basically has a state of passing all the air in the air flow passage 3, which is blown out from the indoor blower 27 and then flows via the heat absorber 9, through the auxiliary heater 23 and the radiator 4 in the heating heat exchange passage 3A, but respectively perform an air volume adjustment as well.

Consequently, the high-temperature high-pressure gas refrigerant discharged from the compressor 2 to the refrigerant pipe 13G flows into the bypass pipe 35 without flowing to the radiator 4 and reaches the refrigerant pipe 13E on the downstream side of the outdoor expansion valve 6 through the solenoid valve 40. At this time, since the outdoor expansion valve 6 is fully closed, the refrigerant flows into the outdoor heat exchanger 7. The refrigerant flowing into the outdoor heat exchanger 7 is cooled by the running therein or the outdoor air to pass through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and reaches the indoor expansion valve 8 through the internal heat exchanger 19. After the refrigerant is decompressed in the indoor expansion valve 8, the refrigerant flows into the heat absorber 9 to evaporate. The air blown out from the indoor blower 27 is cooled by the heat absorbing operation at this time, and the water in the air coagulates to adhere to the heat absorber 9, and hence, the air in the air flow passage 3 is cooled and dehumidified. The refrigerant evaporated in the heat absorber 9 flows through the internal heat exchanger 19 to reach the accumulator 12 via the refrigerant pipe 13C, and is sucked into the compressor 2 therethrough, thereby repeating this circulation.

At this time, since the valve position of the outdoor expansion valve 6 is fully closed, it is possible to suppress or prevent the disadvantage that the refrigerant discharged from the compressor 2 reversely flows from the outdoor expansion valve 6 into the radiator 4. Thus, the lowering of a refrigerant circulation amount is suppressed or eliminated to enable an air conditioning capacity to be ensured. Further, in the dehumidifying and heating mode, the heat pump controller 32 energizes the auxiliary heater 23 to generate heat. Consequently, the air cooled and dehumidified in the heat absorber 9 is further heated in the process of passing through the auxiliary heater 23, and the temperature rises so that the dehumidifying and heating of the vehicle interior are performed.

The heat pump controller 32 controls the number of revolutions NC of the compressor 2 on the basis of a temperature (the heat absorber temperature Te) of the heat absorber 9 detected by the heat absorber temperature sensor 48 and a target heat absorber temperature TEO being a target value of the heat absorber temperature Te calculated by the air conditioning controller 20, takes an average value of the detection value TptcDr of the auxiliary heater temperature sensor 50Dr and the detection value TptcAs of the auxiliary heater temperature sensor 50As as an auxiliary heater temperature Tptc, and controls energization (heating by heat generation) of the auxiliary heater 23 on the basis of the auxiliary heater temperature Tptc and the target heater temperature TCO, thereby appropriately preventing the lowering of a temperature of the air to be blown out from the respective outlets 29A through 29C to the vehicle interior by the heating by the auxiliary heater 23 while appropriately performing the cooling and dehumidifying of the air by the heat absorber 9. Consequently, it is possible to control the temperature of the air blown out to the vehicle interior to a suitable heating temperature while dehumidifying the air, and to achieve comfortable and efficient dehumidifying and heating of the vehicle interior.

Incidentally, since the auxiliary heater 23 is disposed on the air upstream side of the radiator 4, the air heated in the auxiliary heater 23 passes through the radiator 4, but the refrigerant is not caused to flow into the radiator 4 in the dehumidifying and heating mode. Hence, there is also eliminated the disadvantage that the radiator 4 absorbs heat from the air heated by the auxiliary heater 23. That is, the temperature of the air blown out to the vehicle interior is suppressed from being lowered by the radiator 4, and a COP is also improved.

(3) Dehumidifying and Cooling Mode

Next, in the dehumidifying and cooling mode, the heat pump controller 32 opens the solenoid valve 17 and closes the solenoid valve 21. Further, the heat pump controller 32 opens the solenoid valve 30 and closes the solenoid valve 40. Then, the heat pump controller 32 operates the compressor 2. The air conditioning controller 20 operates the respective blowers 15 and 27, and each of the air mix dampers 28Dr and 28As basically has a state of passing all the air in the air flow passage 3, which is blown out from the indoor blower 27 and then flows via the heat absorber 9, through the auxiliary heater 23 and the radiator 4 in the heating heat exchange passage 3A, but performs an adjustment of an air volume as well.

Thus, the high-temperature high-pressure gas refrigerant discharged from the compressor 2 flows from the refrigerant pipe 13G into the radiator 4 via the solenoid valve 30. Since the air in the air flow passage 3 passes through the radiator 4, the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled and dehumidified.

The refrigerant evaporated in the heat absorber 9 flows through the internal heat exchanger 19 to reach the accumulator 12 through the refrigerant pipe 13C, and flows therethrough to be sucked into the compressor 2, thereby repeating this circulation. Since the heat pump controller 32 does not perform energization to the auxiliary heater 23 in the dehumidifying and cooling mode, the air cooled and dehumidified by the heat absorber 9 is reheated (radiation capability being lower than that during the heating) in the process of passing the radiator 4. Thus, the dehumidifying and cooling of the vehicle interior are performed.

The heat pump controller 32 controls the number of revolutions NC of the compressor 2 on the basis of the temperature (the heat absorber temperature Te) of the heat absorber 9 which is detected by the heat absorber temperature sensor 48, and the target heat absorber temperature TEO (transmitted from the air conditioning controller 20) being its target value. Also, the heat pump controller 32 calculates a target radiator pressure PCO from the above-described target heater temperature TCO, and controls the valve position of the outdoor expansion valve 6 on the basis of the target radiator pressure PCO and the refrigerant pressure (the radiator pressure PCI that is a high pressure of the refrigerant circuit R) of the radiator 4 which is detected by the radiator pressure sensor 47 to control heating by the radiator 4.

(4) Cooling Mode

Next, in the cooling mode, the heat pump controller 32 fully opens the valve position of the outdoor expansion valve 6 in the above state of the dehumidifying and cooling mode. Then, the heat pump controller 32 operates the compressor 2 and does not perform energization to the auxiliary heater 23. The air conditioning controller 20 operates the respective blowers 15 and 27, and each of the air mix dampers 28Dr and 28As has a state of adjusting a ratio at which the air in the air flow passage 3 blown out from the indoor blower 27 and passed through the heat absorber 9 is to be passed through the auxiliary heater 23 and the radiator 4 in the heating heat exchange passage 3A.

Consequently, the high-temperature high-pressure gas refrigerant discharged from the compressor 2 flows from the refrigerant pipe 13G into the radiator 4 through the solenoid valve 30, and the refrigerant flowing out from the radiator 4 flows through the refrigerant pipe 13E to reach the outdoor expansion valve 6. At this time, the outdoor expansion valve 6 is fully opened, and hence, the refrigerant passes therethrough and flows into the outdoor heat exchanger 7 as it is, where the refrigerant is air-cooled by the running therein or the outdoor air to pass through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and reaches the indoor expansion valve 8 through the internal heat exchanger 19. The refrigerant is decompressed in the indoor expansion valve 8 and then flows into the heat absorber 9 to evaporate. The air blown out from the indoor blower 27 is cooled by the heat absorbing operation at this time. Further, the water in the air coagulates to adhere to the heat absorber 9.

The refrigerant evaporated in the heat absorber 9 flows through the internal heat exchanger 19 to reach the accumulator 12 through the refrigerant pipe 13C, and flows therethrough to be sucked into the compressor 2, thereby repeating this circulation. The air cooled and dehumidified in the heat absorber 9 is blown out from the respective outlets 29A through 29C to the vehicle interior (a part thereof passes through the radiator 4 to perform heat exchange), thereby performing the cooling of the vehicle interior. Further, in this cooling mode, the heat pump controller 32 controls the number of revolutions NC of the compressor 2 on the basis of the temperature (the heat absorber temperature Te) of the heat absorber 9 which is detected by the heat absorber temperature sensor 48, and the above-described target heat absorber temperature TEO being its target value.

(5) MAX Cooling Mode (Maximum Cooling Mode)

Next, in the MAX cooling mode as the maximum cooling mode, the heat pump controller 32 opens the solenoid valve 17 and closes the solenoid valve 21. Further, the heat pump controller 32 closes the solenoid valve 30 and opens the solenoid valve 40, and fully closes the valve position of the outdoor expansion valve 6. Then, the heat pump controller 32 operates the compressor 2 and does not perform energization to the auxiliary heater 23. The air conditioning controller 20 operates the respective blowers 15 and 27, and each of the air mix dampers 28Dr and 28As has a state of adjusting a ratio at which the air in the air flow passage 3 blown out from the indoor blower 27 and passed through the heat absorber 9 is to be passed through the auxiliary heater 23 and the radiator 4 in the heating heat exchange passage 3A.

Thus, the high-temperature high-pressure gas refrigerant discharged from the compressor 2 to the refrigerant pipe 13G flows into the bypass pipe 35 without flowing to the radiator 4, and reaches the refrigerant pipe 13E on the downstream side of the outdoor expansion valve 6 through the solenoid valve 40. At this time, since the outdoor expansion valve 6 is fully closed, the refrigerant flows into the outdoor heat exchanger 7. The refrigerant flowing into the outdoor heat exchanger 7 is air-cooled by the running therein or the outdoor air to pass through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and reaches the indoor expansion valve 8 through the internal heat exchanger 19. The refrigerant is decompressed in the indoor expansion valve 8 and then flows into the heat absorber 9 to evaporate. The air blown out from the indoor blower 27 is cooled by the heat absorbing operation at this time. Further, since the water in the air coagulates to adhere to the heat absorber 9, the air in the air flow passage 3 is dehumidified. A circulation is repeated in which the refrigerant evaporated in the heat absorber 9 flows through the internal heat exchanger 19 to reach the accumulator 12 via the refrigerant pipe 13C, and flows therethrough to be sucked into the compressor 2. At this time, since the outdoor expansion valve 6 is fully closed, it is possible to similarly suppress or prevent the disadvantage that the refrigerant discharged from the compressor 2 reversely flows from the outdoor expansion valve 6 to the radiator 4. Thus, the lowering of a refrigerant circulation amount is suppressed or eliminated to enable an air conditioning capacity to be ensured.

Here, since the high-temperature refrigerant flows into the radiator 4 in the above-described cooling mode, direct heat conduction from the radiator 4 to the HVAC unit 10 occurs in no small way. Since, however, the refrigerant does not flow into the radiator 4 in the MAX cooling mode, the air in the air flow passage 3 from the heat absorber 9 is not heated by the heat transferred from the radiator 4 to the HVAC unit 10. Therefore, the strong cooling of the vehicle interior is performed, and under such an environment that the outdoor air temperature Tam is high in particular, the vehicle interior is rapidly cooled to make it possible to achieve comfortable vehicle interior air conditioning. Further, even in the MAX cooling mode, the heat pump controller 32 controls the number of revolutions NC of the compressor 2 on the basis of the temperature (the heat absorber temperature Te) of the heat absorber 9 which is detected by the heat absorber temperature sensor 48, and the above-described target heat absorber temperature TEO being its target value.

(6) Auxiliary Heater Single Mode

Incidentally, the control device 11 of the embodiment has an auxiliary heater single mode of in the cases such as when excessive frosting occurs in the outdoor heat exchanger 7, etc., stopping the compressor 2 and the outdoor blower 15 in the refrigerant circuit R, and energizing the auxiliary heater 23 to heat the vehicle interior only by the auxiliary heater 23. Even in this case, the heat pump controller 32 takes an average value of the detection value TptcDr of the auxiliary heater temperature sensor 50Dr and the detection value TptcAs of the auxiliary heater temperature sensor 50As as an auxiliary heater temperature Tptc and controls energization (heat generation) of the auxiliary heater 23 on the basis of the auxiliary heater temperature Tptc and the above-described target heater temperature TCO.

Further, the air conditioning controller 20 operates the indoor blower 27, and each of the air mix dampers 28Dr and 28As has a state of passing the air in the air flow passage 3, which is blown out from the indoor blower 27, through the auxiliary heater 23 of the heating heat exchange passage 3A to adjust an air volume. The air heated by the auxiliary heater 23 is blown out from the respective outlets 29A through 29C to the vehicle interior, and hence the heating of the vehicle interior is performed.

(7) Changing of Operation Mode

The air conditioning controller 20 calculates the aforementioned target outlet temperature TAO from the following equation (I). The target outlet temperature TAO is a target value of the temperature of the air blown out to the vehicle interior.

$$TAO=(Tset-Tin) \times K+Tbal(f(Tset,SUN,Tam)) \quad (I)$$

where Tset is a predetermined temperature of the vehicle interior which is set by the air conditioning operating portion 53, Tin is an indoor air temperature detected by the indoor air temperature sensor 37, K is a coefficient, and Tbal is a balance value calculated from the predetermined value Tset, the solar radiation amount SUN detected by the solar radiation sensor 51, and the outdoor air temperature Tam detected by the outdoor air temperature sensor 33. Further, in general, the lower the outdoor air temperature Tam is, the higher the target outlet temperature TAO becomes, and the target outlet temperature TAO is lowered with rising of the outdoor air temperature Tam.

The heat pump controller 32 selects any operation mode from the above respective operation modes on the basis of the outdoor air temperature Tam (detected by the outdoor air temperature sensor 33) and the target outlet temperature TAO transmitted from the air conditioning controller 20 via the vehicle communication bus 65 on startup, and transmits the respective operation modes to the air conditioning controller 20 through the vehicle communication bus 65. Further, after the startup, the heat pump controller 32 changes the respective operation modes on the basis of parameters such as the outdoor air temperature Tam, the humidity of the vehicle interior, the target outlet temperature TAO, a heating temperature TH (a temperature of the air on the leeward side of the radiator 4, which is an estimated value) to be described later, the target heater temperature TCO, the heat absorber temperature Te, the target heat absorber temperature TEO, the presence or absence of a dehumidifying request for the vehicle interior, etc. and thereby appropriately changes the heating mode, the dehumidifying and heating mode, the dehumidifying and cooling mode, the cooling mode, the MAX cooling mode, and the auxiliary heater single mode according to environment conditions or the necessity of the dehumidifying request to control the temperature of the air blown out to the vehicle interior to the target outlet temperature TAO, thereby achieving comfortable and efficient vehicle interior air conditioning. Incidentally, description will be made in detail later as to transition control from the dehumidifying and heating mode to the heating mode.

Here, the above heating temperature TH is a temperature of the air on the leeward side of the radiator 4. The heat pump controller 32 estimates the heating temperature TH from a first-order lag calculation formula (II) shown below:

$$TH=(INTL1 \times TH0+Tau1 \times THz)/(Tau1+INTL1) \quad (II)$$

where INTL1 is a calculation period (constant), Tau1 is a time constant of a first-order lag, TH0 is a steady-state value of the heating temperature TH in a steady state before a first-order lag calculation, and THz is a previous value of the heating temperature TH. Estimating the heating temperature TH in this manner makes it unnecessary to provide a special temperature sensor. Further, the heat pump controller 32 changes the above time constant Tau1 and steady-state value TH0 according to the aforementioned operation modes to thereby make the above-described estimation formula (II) different depending on the operation mode to estimate the heating temperature TH. Then, the heating temperature TH is transmitted to the air conditioning controller 20 through the vehicle communication bus 65.

(8) Transition Control from Dehumidifying and Heating Mode to Heating Mode Based on Heat Absorber Suction Air Temperature Tevain Next, description will be made as to transition control from the dehumidifying and heating mode to the heating mode by the heat pump controller 32 with reference to FIG.

4. In the present invention, the heat pump controller 32 performs transition control from the dehumidifying and heating mode to the heating mod on the basis of the temperature (the heat absorber suction air temperature Tevain) of the air flowing into the heat absorber 9 and the target heat absorber temperature TEO.

(8-1) Estimation (Calculation) of Heat Absorber Suction Air Temperature Tevain

Further, since there is provided no temperature sensor to detect the temperature of the air flowing into the heat absorber 9 in the present embodiment, the heat pump controller 32 estimates the heat absorber suction air temperature Tevain by using the aforementioned indoor/outdoor air ratio RECrate. Description will first be made as to the estimation (calculation) of the heat absorber suction air temperature Tevain.

In the embodiment, when the ratio (indoor/outdoor air ratio RECrate) between the outdoor air and indoor air in the air to be passed through the air flow passage 3 changes, the temperature (the heat absorber suction air temperature Tevain) of the air flowing into the heat absorber 9 changes. Thus, the heat pump controller 32 calculates and estimates the heat absorber suction air temperature Tevain using the following formulas (III) and (IV) on the basis of the indoor/outdoor air ratio RECrate.

$$\text{Tevain} = (\text{INTL2} \times \text{Tevain0} + Tau2 \times \text{Tevainz}) / (Tau2 + \text{INTL2}) \qquad (III)$$

$$\text{Tevain0} = Tam \times (1 - \text{RECrate} \times E1) + Tin \times \text{RECrate} \times E1 + H1 \qquad (IV)$$

where INTL2 is a calculation period (constant), Tau2 is a time constant of a first-order lag, Tevain0 is a steady-state value of the heat absorber suction air temperature Tevain in a steady state before a first-order lag calculation, and Tevainz is a previous value of the heat absorber suction air temperature Tevain. Further, Tam is an outdoor air temperature, Tin is an indoor air temperature, E1 is an adjustment error (correction term) accompanying a structural variation of the suction changing damper 26 and a variation in its stop position, and H1 is a heat receiving amount (an amount of air heated by the indoor blower 27 operated to generate heat: offset) from the indoor blower 27.

(8-2) Transition from Dehumidifying and Heating Mode to Heating Mode

Here, as described above, in the dehumidifying and heating mode, the auxiliary heater 23 is caused to generate heat, and the air cooled (dehumidified) by the heat absorber 9 is heated, thereby deteriorating operation efficiency as compared with the heating mode. On the other hand, if the temperature (heat absorber suction air temperature Tevain) of the air flowing into the heat absorber 9 is lower than the target heat absorber temperature TEO, it is not necessary to originally dehumidify the vehicle interior by the heat absorber 9.

Thus, the heat pump controller 32 performs changing from the dehumidifying and heating mode to the heating mode on the basis of the heat absorber suction air temperature Tevain and the target heat absorber temperature TEO calculated as described above. Specifically, it will be described using FIG. 4. In order to describe the control of shifting from the dehumidifying and heating mode to the heating mode by the heat pump controller 32 in the embodiment, FIG. 4 shows changes in the target value (target number of revolutions) of the number of revolutions NC of the compressor 2, the heat absorber temperature Te, the target heat absorber temperature TEO, and the heat absorber suction air temperature Tevain when shifting from the dehumidifying and heating mode to the heating mode.

In the dehumidifying and heating mode, as described above, the heat pump controller 32 controls the number of revolutions NC of the compressor 2 on the basis of the heat absorber temperature Te and the target heat absorber temperature TEO. When the indoor/outdoor air ratio RECrate by the suction changing damper 26 is changed during the dehumidifying and heating mode, the heat absorber temperature Te starts to gradually drop, but the heat absorber suction air temperature Tevain suddenly drops.

Figure 4:
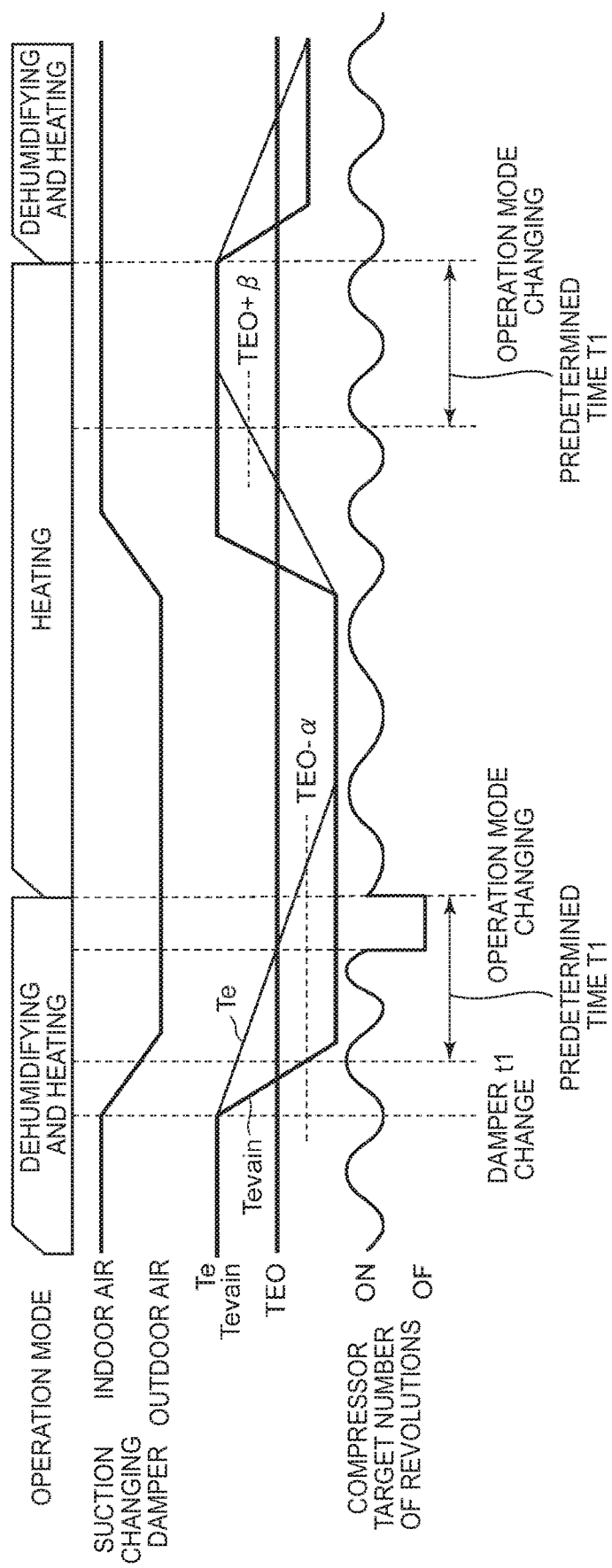
FIG. 4 is a diagram describing transition control from a dehumidifying and heating mode to a heating mode by a heat pump controller of FIG. 2.
Figure 4A:
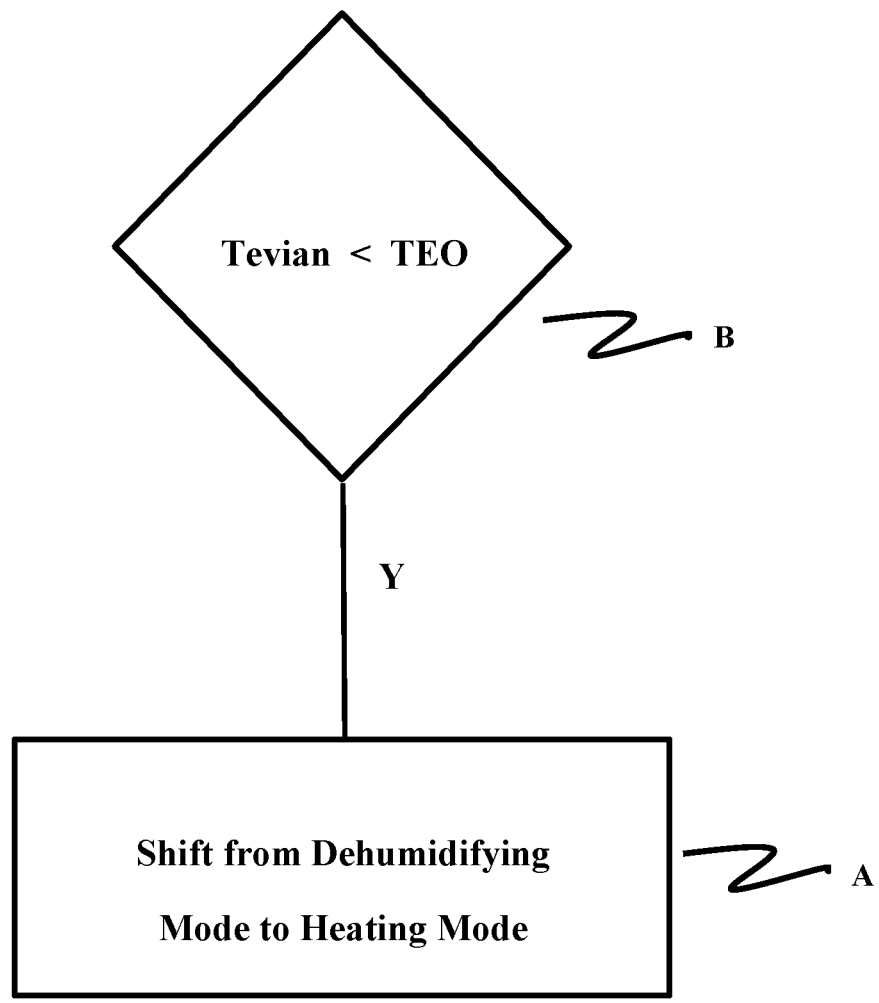
FIG. 4A is a diagram describing transition control from a dehumidifying and heating mode in accordance with an alternative embodiment.

Then, when the heat absorber suction air temperature Tevain is assumed to have been lowered more than a temperature (TEO−α) lowered by a predetermined value α more than the target heat absorber temperature TEO at a time t1 of FIG. 4, the heat pump controller 32 counts a timer from this point of time. Incidentally, thereafter, when the heat absorber temperature Te is reduced and lowered more than the target heat absorber temperature TEO, the heat pump controller 32 stops from a state of operating (ON) the compressor 2 (OFF). Then, when (Tevain<(TEO−α)) is reached at the time t1 and then its state is continued for a predetermined time T1, the heat pump controller 32 changes the operation mode from the dehumidifying and heating mode to the heating mode.

That is, in the present invention, when the state (Tevain<(TEO−α)) in which the heat absorber suction air temperature Tevain is lowered more than the target heat absorber temperature TEO-predetermined value α in the dehumidifying and heating mode is continued for the predetermined time T1, the heat pump controller 32 determines the dehumidification of the vehicle interior to be unnecessary and changes the operation mode to the heating mode.

Incidentally, thereafter, when a state in which the heat absorber temperature Te becomes higher than the target heat absorber temperature TEO+a predetermined value β (TEO+β) is continued for the predetermined time T1, the heat pump controller 32 changes the heating mode to the dehumidifying and heating mode on the condition that an operation button (A/C button) of the vehicular air conditioner 1 provided in the air conditioning operating portion 53 is ON (there is a request for dehumidification in the vehicle interior).

Thus, in the present invention, the heat pump controller 32 shifts the dehumidifying and heating mode (dehumidifying mode) to the heating mode on the basis of the fact that the heat absorber suction air temperature Tevain being the temperature of the air flowing into the heat absorber 9 has become lower than the target heat absorber temperature TEO being the target value of the heat absorber temperature Te. Therefore, even if the heat absorber temperature Te does not become lower than the target heat absorber temperature TEO as in the related art, the dehumidifying and heating mode is changed to the heating mode with the heat absorber suction air temperature Tevain being lowered more than the target heat absorber temperature TEO.

Thus, it is possible to make a determination that the dehumidification is unnecessary in the vehicle interior earlier than in the related art and make a prompt transition from the dehumidifying and heating mode poor in operation efficiency to the heating mode in which the operation efficiency becomes good, thereby making it possible to achieve a reduction in power consumption. In particular, this becomes extremely suitable for the vehicle air conditioner 1 driven by the battery.

In particular, in the embodiment, since the heat pump controller 32 makes the transition from the dehumidifying and heating mode to the heating mode where the state in which the heat absorber suction air temperature Tevain becomes lower than the target heat absorber temperature TEO-predetermined value α (Tevain<TEO−α) is continued for the predetermined time T1, the heat pump controller 32 is capable of appropriately performing the transition from the dehumidifying and heating mode to the heating mode.

Further, in the embodiment, since the heat absorber suction air temperature Tevain is estimated based on the ratio (the indoor/outdoor air ratio RECrate) between the outdoor air and indoor air adjusted by the suction changing damper 26, the heat pump controller 32 is capable of estimating the heat absorber suction air temperature Tevain and making the transition from the dehumidifying and heating mode to the heating mode without providing a special temperature sensor.

Here, when the ratio (the indoor/outdoor air ratio RECrate) between the outdoor air and indoor air changes, it takes some time until it is reflected on the heat absorber suction air temperature Tevain. That is, the heat absorber suction air temperature Tevain does not change immediately even if the ratio between the outdoor air and indoor air changes. In the embodiment, however, since the heat pump controller 32 calculates the heat absorber suction air temperature Tevain by the first-order lag calculation based on the ratio between the outdoor air and indoor air, the heat pump controller is capable of performing the transition from the dehumidifying and heating mode to the heating mode according to the actual change in the heat absorber suction air temperature Tevain.

Further, in the embodiment, since the heat pump controller 32 corrects the heat absorber suction air temperature Tevain on the basis of the heat receiving amount H1 from the indoor blower 27 and the adjustment error E1 in the suction changing damper 26, the heat pump controller is capable of estimating the heat absorber suction air temperature Tevain more accurately.

Incidentally, in the aforementioned embodiment, the heat absorber suction air temperature Tevain is corrected based on both of the heat receiving amount H1 from the indoor blower 27 and the adjustment error E1 in the suction changing damper 26, but is not limited thereto. The heat absorber suction air temperature Tevain may be corrected using either of them.

Furthermore, in the embodiment, the heat absorber suction air temperature Tevain is estimated based on the ratio (the indoor/outdoor air ratio RECrate) between the outdoor air and indoor air. However, when a heat absorber suction temperature sensor 71 detecting a heat absorber suction temperature Tevain is provided o the air inflow side of the heat absorber 9 as indicated by a broken line in FIG. 2, the transition control from the dehumidifying and heating mode to the heating mode may be executed on the basis of the heat absorber suction temperature Tevain detected by the heat absorber suction temperature sensor 71.

Embodiment 2

Figure 5:
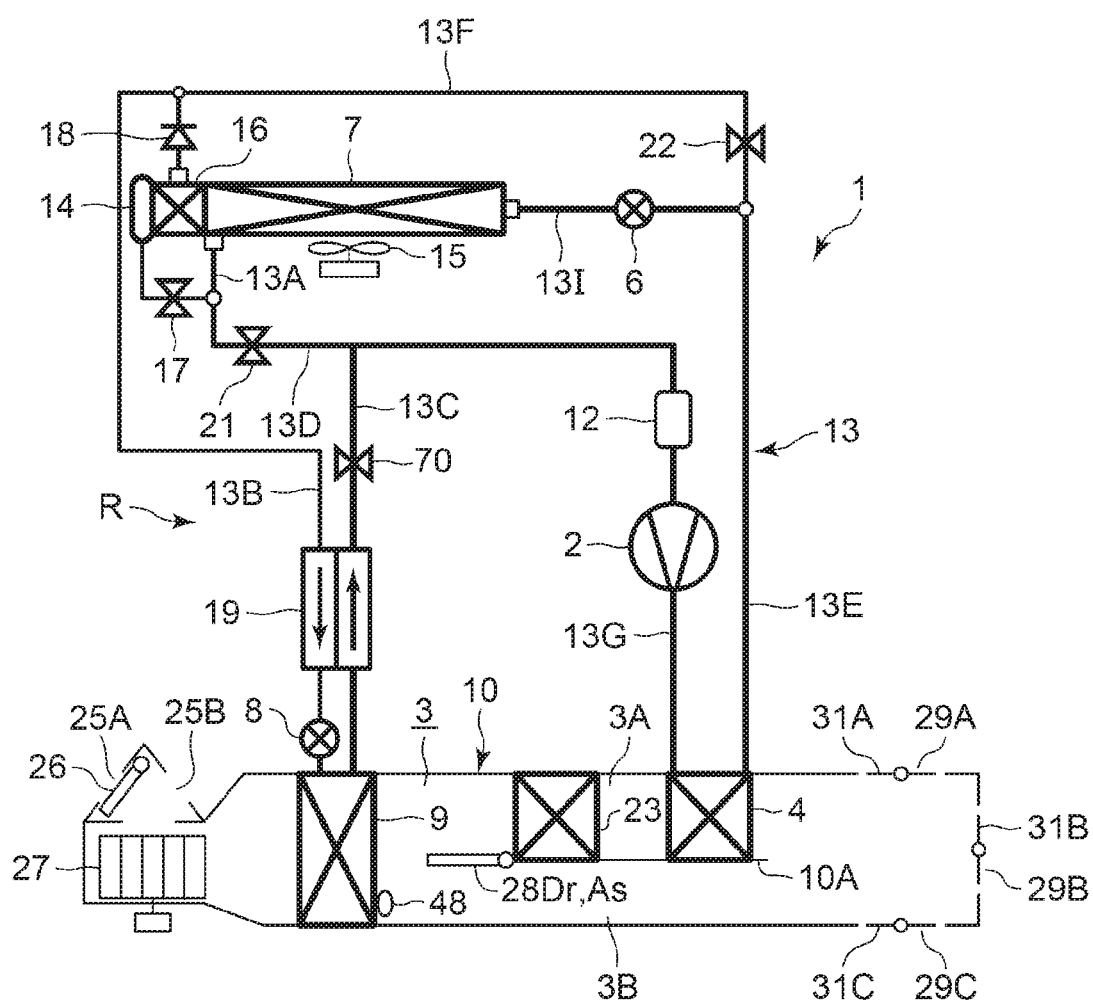
FIG. 5 is a constitutional view of a vehicle air conditioner of another embodiment of the present invention.

Next, FIG. 5 shows a constitutional view of a vehicle air conditioner 1 of another embodiment to which the present invention is applied. Incidentally, in this drawing, components denoted at the same reference numerals as those in FIG. 1 have the same or similar function. In the case of the present embodiment, an outlet of a subcooling portion 16 is connected to a check valve 18. An outlet of the check valve 18 is connected to a refrigerant pipe 13B. Incidentally, the check valve 18 has a refrigerant pipe 13B (an indoor expansion valve 8) side which serves as a forward direction.

Further, a refrigerant pipe 13E on an outlet side of a radiator 4 branches before an outdoor expansion valve 6, and this branching refrigerant pipe (hereinafter called a bypass circuit) 13F communicates and connects with a refrigerant pipe 13B on a downstream side of the check valve 18 via a solenoid valve 22 (for dehumidification). Additionally, an evaporation pressure control valve 70 is connected to a refrigerant pipe 13C on an outlet side of a heat absorber 9 on a refrigerant downstream side of an internal heat exchanger 19 and on a refrigerant upstream side than a joining point with a refrigerant pipe 13D.

Then, these solenoid valve 22 and evaporation pressure control valve 70 are also controlled by being connected to an output of a heat pump controller 32. Incidentally, the bypass device 45 constituted of the bypass pipe 35, the solenoid valve 30, and the solenoid valve 40 in FIG. 1 of the aforementioned embodiment is not provided. Since others are similar to those in FIG. 1, their description will be omitted.

With the above constitution, an operation of the vehicle air conditioner 1 of this embodiment will be described. In this embodiment, the heat pump controller 32 changes and executes respective operation modes of a heating mode, a dehumidifying and heating mode, an internal cycle mode, a dehumidifying and cooling mode, a cooling mode, and an auxiliary heater single mode (a MAX cooling mode does not exist in this embodiment).

Incidentally, since operations and a flow of a refrigerant when the heating mode, the dehumidifying and cooling mode, and the cooling mode are selected, and the auxiliary heater single mode are similar to those in the above-described embodiment (embodiment 1), their description will be omitted. However, in the present embodiment (embodiment 2), the solenoid valve 22 is assumed to be closed in these heating mode, dehumidifying and cooling mode and cooling mode.

(9) Dehumidifying and Heating Mode of Vehicle Air Conditioner 1 in FIG. 5 (Dehumidifying Mode)

On the other hand, when the dehumidifying and heating mode in this case as the dehumidifying mode is selected, the heat pump controller 32 opens a solenoid valve 21 (for the heating) and closes a solenoid valve 17 (for the cooling) in this embodiment (embodiment 2). Also, the heat pump controller 32 opens the solenoid valve 22 (for the dehumidification). Then, the heat pump controller 32 operates a compressor 2. An air conditioning controller 20 operates respective blowers 15 and 27, and an air mix damper 28 basically has a state of passing all the air in an air flow passage 3, which is blown out from the indoor blower 27 and then flows via the heat absorber 9, through an auxiliary heater 23 and a radiator 4 in a heating heat exchange passage 3A, but performs an air volume adjustment as well.

Consequently, a high-temperature high-pressure gas refrigerant discharged from the compressor 2 flows from a refrigerant pipe 13G into the radiator 4. Since the air in the air flow passage 3 flowing into the heating heat exchange passage 3A passes through the radiator 4, the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows out from the radiator 4 and then reaches the outdoor expansion valve 6 through the refrigerant pipe 13E. The refrigerant flowing into the outdoor expansion valve 6 is decompressed therein, and then flows into an outdoor heat exchanger 7. The refrigerant flowing into the outdoor heat exchanger 7 evaporates, and the heat is pumped up from the outdoor air passed by running or the outdoor blower 15. In other words, a refrigerant circuit R functions as a heat pump. Then, a circulation is repeated in which the low-temperature refrigerant flowing out from the outdoor heat exchanger 7 flows via a refrigerant pipe 13A, the solenoid valve 21, and the refrigerant pipe 13D from the refrigerant pipe 13C into an accumulator 12, where it is subjected to gas-liquid separation, and then the gas refrigerant is sucked into the compressor 2.

Further, a part of the condensed refrigerant flowing to the refrigerant pipe 13E through the radiator 4 is distributed and flows through the solenoid valve 22 to reach from the bypass circuit 13F and the refrigerant pipe 13B to the indoor expansion valve 8 through the internal heat exchanger 19. The refrigerant is decompressed by the indoor expansion valve 8 and then flows into the heat absorber 9 to evaporate. The water in the air blown out from the indoor blower 27 coagulates to adhere to the heat absorber 9 by a heat absorbing operation at this time, and hence, the air is cooled and dehumidified.

A circulation is repeated in which the refrigerant evaporated in the heat absorber 9 joins the refrigerant from the refrigerant pipe 13D at the refrigerant pipe 13C through the internal heat exchanger 19 and the evaporation pressure control valve 70 successively, and is then sucked into the compressor 2 through the accumulator 12. The air dehumidified in the heat absorber 9 is reheated in the process of passing through the radiator 4, and hence the dehumidifying and heating of the vehicle interior are performed.

The air conditioning controller 20 transmits a target heater temperature TCO (a target value of a heating temperature TH) calculated from a target outlet temperature TAO to the heat pump controller 32. The heat pump controller 32 controls the number of revolutions NC of the compressor 2 on the basis of a heat absorber temperature Te and a target heat absorber temperature TEO. Further, the heat pump controller 32 controls a valve position of the outdoor expansion valve 6 on the basis of the heat absorber temperature Te and the target heat absorber temperature TEO. Additionally, the heat pump controller 32 opens (to enlarge a flow path)/closes (to allow small refrigerant to flow) the evaporation pressure control valve 70 on the basis of the heat absorber temperature Te to prevent inconvenience that the heat absorber 9 is frozen due to an excessive drop of its temperature.

(10) Internal Cycle Mode of Vehicle Air Conditioner 1 of FIG. 5

Further, in the internal cycle mode, the heat pump controller 32 fully closes the outdoor expansion valve 6 in a state of the above dehumidifying and heating mode (fully closed position) and closes the solenoid valve 21. With the closure of the outdoor expansion valve 6 and the solenoid valve 21, the inflow of the refrigerant into the outdoor heat exchanger 7, and the outflow of the refrigerant from the outdoor heat exchanger 7 are prevented, and hence the condensed refrigerant flowing into the refrigerant pipe 13E through the radiator 4 all flows into the bypass circuit 13F through the solenoid valve 22. Then, the refrigerant flowing through the bypass circuit 13F reaches from the refrigerant pipe 13B to the indoor expansion valve 8 through the internal heat exchanger 19. The refrigerant is decompressed by the indoor expansion valve 8 and then flows into the heat absorber 9 to evaporate. The water in the air blown out from the indoor blower 27 coagulates to adhere to the heat absorber 9 by a heat absorbing operation at this time, and hence, the air is cooled and dehumidified.

A circulation is repeated in which the refrigerant evaporated in the heat absorber 9 flows into the refrigerant pipe 13C through the internal heat exchanger 19 and the evaporation pressure control valve 70 successively and is sucked into the compressor 2 through the accumulator 12. The air dehumidified in the heat absorber 9 is reheated in the process of passing through the radiator 4, and hence the dehumidifying and heating of the vehicle interior are performed. Since, however, the refrigerant is circulated between the radiator 4 (heat radiation) and the heat absorber 9 (heat absorption) lying in the air flow passage 3 on the indoor side in the internal cycle mode, the pumping up of heat from the outdoor air is not performed, and a heating capability corresponding to power consumption of the compressor 2 is exhibited. Since the whole amount of the refrigerant flows through the heat absorber 9 which exhibits a dehumidifying operation, a dehumidifying capability is high as compared with the above dehumidifying and heating mode, but the heating capability becomes low. The control of the compressor 2 by the heat pump controller 32 is similar to that in the dehumidifying and heating mode.

Then, as with (8) of the aforementioned embodiment (embodiment 1) even in the case of this embodiment, if the heat pump controller 32 makes a transition from the dehumidifying and heating mode to the heating mode on the basis of the fact that the heat absorber suction air temperature Tevain being the temperature of the air flowing into the heat absorber 9 has become lower than the target heat absorber temperature TEO being the target value of the heat absorber temperature Te, the dehumidifying and heating mode is changed to the heating mode with the heat absorber suction air temperature Tevain being lowered more than the target heat absorber temperature TEO even if the heat absorber temperature Te does not become lower than the target heat absorber temperature TEO as in the related art.

Thus, it is possible to make a determination that the dehumidification is unnecessary in the vehicle interior earlier than in the related art and make a prompt transition from the dehumidifying and heating mode poor in operation efficiency to the heating mode in which the operation efficiency becomes good, thereby making it possible to reduce power consumption.

Incidentally, in each embodiment described above, the present invention has been applied to the vehicle air conditioner 1 capable of dehumidifying the vehicle interior in the dehumidifying and heating mode, the dehumidifying and cooling mode, the internal cycle mode, etc., but is not limited thereto. The present invention may be executed with only the dehumidifying and heating mode as the dehumidifying mode. Further, the parameters, the numerical values and the like used for the control shown in each embodiment are not limited thereto and should be selected/set as appropriate depending on a device to be applied in the scope not departing from the spirit of the present invention.

DESCRIPTION OF REFERENCE NUMERALS 1 vehicle air conditioner
2 compressor
3 air flow passage
4 radiator
6 outdoor expansion valve
7 outdoor heat exchanger
8 indoor expansion valve
9 heat absorber
10 HVAC unit
11 control device 20 air conditioning controller
23 auxiliary heater (auxiliary heating device)
25A outdoor air suction port
25B indoor air suction port
26 suction changing damper
27 indoor blower (blower fan)
32 heat pump controller
45 bypass device
48 heat absorber temperature sensor
R refrigerant circuit.

The invention claimed is:

1. A vehicle air conditioner comprising:
a compressor to compress a refrigerant;
an air flow passage through which air to be supplied to a vehicle interior flows;
a heat absorber to let the refrigerant absorb heat, thereby cooling the air to be supplied from the air flow passage to the vehicle interior;
a radiator disposed on a leeward side of the heat absorber to the flow of the air in the air flow passage to let the refrigerant radiate heat, thereby heating the air to be supplied from the air flow passage to the vehicle interior;
an outdoor heat exchanger disposed outside the vehicle interior;
an auxiliary heating device to let the air to be supplied from the air flow passage to the vehicle interior heat; and
a control device,
whereby the control device changes and executes a heating mode to let the refrigerant discharged from the compressor radiate heat in the radiator, decompress the refrigerant from which the heat has been radiated, and then let the refrigerant absorb heat in the outdoor heat exchanger, and a dehumidifying mode to let the refrigerant discharged from the compressor flow into the outdoor heat exchanger without flowing to the radiator to radiate heat therein, decompress the refrigerant from which the heat has been radiated, and then let the refrigerant absorb heat in the heat absorber and let the auxiliary heating device generate heat,
wherein the control device shifts from the dehumidifying mode to the heating mode on the basis of a state in which a heat absorber suction air temperature Tevain that is a temperature of the air flowing into the heat absorber became lower than a target heat absorber temperature TEO that is a target value of a temperature Te of the heat absorber.

2. The vehicle air conditioner according to claim 1, wherein when a state (Tevain<TEO-α) in which the heat absorber suction air temperature Tevain becomes lower than the target heat absorber temperature TEO-a predetermined value α is continued for a predetermined time T1, the control device shifts from the dehumidifying mode to the heating mode.

3. The vehicle air conditioner according to claim 2, including a suction changing damper capable of adjusting a ratio between outdoor air flowing into the air flow passage and indoor air being the air of the vehicle interior,
wherein the control device estimates the heat absorber suction air temperature Tevain on the basis of the ratio between the outdoor air and the indoor air which is adjusted by the suction changing damper.

4. The vehicle air conditioner according to claim 2, including a temperature sensor which detects the heat absorber suction air temperature Tevain.

5. The vehicle air conditioner according to claim 1, including a suction changing damper capable of adjusting a ratio between outdoor air flowing into the air flow passage and indoor air being the air of the vehicle interior,
wherein the control device estimates the heat absorber suction air temperature Tevain on the basis of the ratio between the outdoor air and the indoor air which is adjusted by the suction changing damper.

6. The vehicle air conditioner according to claim 5, wherein the control device calculates the heat absorber suction air temperature Tevain by a first-order lag calculation based on the ratio between the outdoor air and the indoor air.

7. The vehicle air conditioner according to claim 6, including an indoor blower to suck the air passed through the suction changing damper and blow out the air to the heat absorber,
wherein the control device corrects the heat absorber suction air temperature Tevain on the basis of a heat receiving amount H1 from the indoor blower and/or an adjustment error E1 in the suction changing damper.

8. The vehicle air conditioner according to claim 5, including an indoor blower to suck the air passed through the suction changing damper and blow out the air to the heat absorber,
wherein the control device corrects the heat absorber suction air temperature Tevain on the basis of a heat receiving amount H1 from the indoor blower and/or an adjustment error E1 in the suction changing damper.

9. The vehicle air conditioner according to claim 1, including a temperature sensor which detects the heat absorber suction air temperature Tevain.

10. A vehicle air conditioner comprising:
a compressor to compress a refrigerant;
an air flow passage through which air to be supplied to a vehicle interior flows;
a heat absorber to let the refrigerant absorb heat, thereby cooling the air to be supplied from the air flow passage to the vehicle interior;
a radiator disposed on a leeward side of the heat absorber to the flow of the air in the air flow passage to let the refrigerant radiate heat, thereby heating the air to be supplied from the air flow passage to the vehicle interior;
an outdoor heat exchanger disposed outside the vehicle interior; and
a control device,
whereby the control device changes and executes a heating mode to let the refrigerant discharged from the compressor radiate heat in the radiator, decompress the refrigerant from which the heat has been radiated, and then let the refrigerant absorb heat in the outdoor heat exchanger, and a dehumidifying mode to let the refrigerant discharged from the compressor radiate heat in the radiator, decompress the refrigerant from which the heat has been radiated, and then let the refrigerant flow into the heat absorber and the outdoor heat exchanger to absorb heat,
wherein the control device shifts from the dehumidifying mode to the heating mode on the basis of a state in which a heat absorber suction air temperature Tevain that is a temperature of the air flowing into the heat absorber became lower than a target heat absorber temperature TEO that is a target value of a temperature Te of the heat absorber.

11. The vehicle air conditioner according to claim 10, wherein when a state (Tevain<TEO-α) in which the heat absorber suction air temperature Tevain becomes lower than the target heat absorber temperature TEO-a predetermined value α is continued for a predetermined time T1, the control device shifts from the dehumidifying mode to the heating mode.

12. The vehicle air conditioner according to claim 10, including a suction changing damper capable of adjusting a ratio between outdoor air flowing into the air flow passage and indoor air being the air of the vehicle interior,
    wherein the control device estimates the heat absorber suction air temperature Tevain on the basis of the ratio between the outdoor air and the indoor air which is adjusted by the suction changing damper.

13. The vehicle air conditioner according to claim 10, including a temperature sensor which detects the heat absorber suction air temperature Tevain.

\* \* \* \* \*